(12) United States Patent
Curry

(10) Patent No.: US 6,231,064 B1
(45) Date of Patent: May 15, 2001

(54) AUTOMOTIVE TRANSPORT TRACTORS, SEMI-TRAILERS, TRAILERS AND COMBINATIONS THEREOF

(76) Inventor: N. Royce Curry, 3493 Reubens Court, Burlington, Ontario (CA), L7N 3K3

( * ) Notice: Subject to any disclaimer, the term of this patent is extended or adjusted under 35 U.S.C. 154(b) by 0 days.

(21) Appl. No.: 09/357,388

(22) Filed: Jul. 20, 1999

(30) Foreign Application Priority Data

Jul. 29, 1998 (CA) .................................................. 2241385

(51) Int. Cl.$^7$ .................................................. B62D 53/06
(52) U.S. Cl. .................. 280/407; 280/407.1; 280/423.1; 280/430; 280/433; 280/438.1; 280/441; 280/656
(58) Field of Search ................................ 280/407, 407.1, 280/411.1, 423.1, 430, 431, 433, 438.1, 441, 656, 149.2

(56) References Cited

U.S. PATENT DOCUMENTS

| | | | |
|---|---|---|---|
| 2,755,104 | * | 7/1956 | Braunberger .......................... 280/407 |
| 2,860,891 | * | 11/1958 | Ramun ................................. 208/407 |
| 3,203,711 | * | 8/1965 | Chew .................................. 280/415 |
| 3,360,280 | * | 12/1967 | Betchart .............................. 280/407 |
| 3,421,778 | * | 1/1969 | Barker et al. ......................... 280/476 |
| 3,439,935 | * | 4/1969 | Guidice ............................... 280/407 |
| 3,479,055 | * | 11/1969 | Cunha et al. ......................... 280/407 |
| 3,508,762 | * | 4/1970 | Pratt ..................................... 280/81 |
| 3,729,214 | * | 4/1973 | Mulcahy et al. ...................... 280/407 |
| 3,826,516 | * | 7/1974 | Weber ................................. 280/407 |
| 3,834,736 | * | 9/1974 | Dodgson .............................. 280/407 |
| 4,033,625 | * | 7/1977 | Fikse .................................. 298/22 R |
| 4,429,892 | * | 2/1984 | Frampton et al. ..................... 280/407 |
| 4,566,714 | * | 1/1986 | Witt et al. ............................ 280/404 |
| 4,635,742 | * | 1/1987 | Bertolini ............................. 180/209 |
| 4,759,563 | * | 7/1988 | Nash .................................. 280/476.1 |
| 4,955,629 | * | 9/1990 | Todd, Jr. et al. ...................... 280/407 |
| 4,969,659 | * | 11/1990 | Ehrlich .............................. 280/470.1 |
| 5,092,623 | * | 3/1992 | Swanner .............................. 280/638 |
| 5,183,371 | * | 2/1993 | O'Daniel ............................. 414/477 |
| 5,449,191 | * | 9/1995 | Cattau ............................... 280/438.1 |
| 5,707,070 | * | 1/1998 | Lindenman et al. ................. 280/438.1 |

* cited by examiner

*Primary Examiner*—Brian L. Johnson
*Assistant Examiner*—Deanna Draper
(74) *Attorney, Agent, or Firm*—Stanley J. Rogers

(57) ABSTRACT

The invention provides a new automotive tractor unit for use with a new semi-trailer unit to form a rigidly-coupled tractor/semi-trailer combination. The tractor has a long wheel base and has its fifth wheel assembly mounted for extended longitudinal movement between a receiving position at its rear end and a mounting position close to the driver's cab. The tractor and semi-trailer chassis frames cooperate with one another to permit pitching between them while preventing yaw between them. The semi-trailer has a retractable landing gear movable beneath the chassis between a forward position close to the king pin to support the semi-trailer front end in the absence of the tractor, and a rear position close to the running wheels so that the semi-trailer can rest on the tractor and be rigidly coupled thereto. Preferably the tractor wheel base is of length from 6.8 meters (22 feet) to 8.5 meters (28 feet), while the fifth wheel assembly is mounted for a longitudinal movement of from 4.8 meters (16 feet) to 6.2 meters (20 feet). The fifth wheel assembly may be movable on the tractor chassis by relative movement between the tractor and semi-trailer units, or by a motor operative between the assembly and chassis. Preferably, the tractor and semi-trailer chassis comprise cooperating guides ensuring that the semi-trailer mounts on the tractor chassis properly transversely centred and in an aligned straight ahead attitude. The retractable landing gear may comprise a hand-operated chain drive or alternatively, or in addition, an equivalent motor-operated drive.

20 Claims, 3 Drawing Sheets

AUTOMOTIVE TRANSPORT TRACTORS, SEMI-TRAILERS, TRAILERS AND COMBINATIONS THEREOF

FIELD OF THE INVENTION

This invention is concerned with new automotive transport tractors and semi-trailers, and the combination thereof, and particularly to such combinations wherein the tractor and semi-trailer can be rigidly connected together to facilitate the connection thereto of a second semi-trailer or trailer to provide a double trailer combination.

REVIEW OF THE PRIOR ART

Increasing the load-carrying capacity of an automotive transport unit (i.e. a unit employing only a single tractor in combination with one or more semi-trailers and/or trailers) is of continuing commercial interest, owing to the cost savings that are possible, and accordingly there have been a substantial number of prior proposals disclosing different equipment for this purpose. Operators interested in maximizing load-carrying capacity usually wish to employ a semi-trailer unit that is as long as possible, but almost all jurisdictions have regulations as to the maximum length of a single tractor/semitrailer combination that is allowed on the highways, typically about 18 meters (60 feet). Another practical limitation on maximum length is imposed by the need when turning corners for the rear wheels of the unit to "off-track" within minimum and maximum limits. A solution that is used increasingly where permitted is to split the load-carrying unit into a semi-trailer pivotally connected to the tractor by the usual king-pin and fifth wheel combination, and a trailer pivotally connected in some way to the rear end of the semi-trailer. Single tractor/semi-trailer combinations are already somewhat unstable, especially with slippery road conditions, owing to the presence of the single articulating pivot and the yaw that it permits, but the occasional jackknifing and overturning that occurs is accepted because of the inherent overall flexibility, practicability, and economy of operation of such units. The problem of yaw instability and the possibility of jackknifing and overturning is considerably increased with double units owing to the presence of at least two articulating pivot points spaced longitudinally a relatively long distance apart, resulting in a considerable increase in the overall yaw rate of the unit. There is therefore a need in the industry for new automotive transport units providing such increased load carrying capacity without, if possible, increasing the yaw rate thereof beyond an acceptable value and also, if possible, owing to the necessarily inherent conservatism of the industry toward radically new designs, making use of established designs of tractors, trailers and semi-trailers for their implementation.

DEFINITION OF THE INVENTION

It is therefore the principal object of the invention to provide a new tractor unit and a new semi-trailer unit that can be used in combination with one another to form a readily releasable rigidly coupled tractor/semi-trailer combination.

It is a more specific object to provide such a tractor/semi-trailer combination comprising a stable rigid releasable connection between the two components that permits maintenance of the required weight distribution between the two components, minimizes roll instability, and eliminates jackknifing.

It is a further object to provide such a tractor/semi-trailer combination comprising a stable rigid releasable connection between the two components making it particularly suited for the coupling of a second semi-trailer unit thereto with only a single articulating pivot present in the resulting double trailer combination, thereby minimizing roll instability and reducing the possibility of jackknifing as compared to the existing double trailer units.

In accordance with the present invention there is provided a new automotive tractor unit for use in a rigidly-coupled tractor/semi-trailer combination comprising:

a long wheel base tractor with a tractor chassis having front and rear ends, a steering wheel assembly and driver's cab at the front end and a drive wheel assembly at the rear end;

the tractor when in the combination being employed with an associated semi-trailer that has front and rear ends and has a king pin at its front end and at least one pair of running wheels at its rear end;

means mounting a fifth wheel assembly on the tractor chassis for extended longitudinal movement between a semi-trailer receiving position close to the rear end of the tractor chassis and a semi-trailer mounting position close to the rear of the driver's cab;

said extended longitudinal movement being such that in the semi-trailer receiving position the fifth wheel assembly can be coupled with and released from the semi-trailer king pin, and in the semi-trailer mounting position the semi-trailer is mounted on the tractor chassis with the fifth wheel assembly and the king pin coupled together and with the running wheels of the semi-trailer adjacent to the tractor drive wheel assembly; and the tractor chassis having thereon connecting means for cooperation with connecting means on the associated semi-trailer chassis when the semi-trailer is mounted on the tractor chassis, the connecting means permitting pitching between the tractor chassis and the semi-trailer chassis while preventing yaw between them.

Also in accordance with the invention there is provided a new semi-trailer unit for use in a rigidly-coupled tractor/semi-trailer combination comprising;

a semi-trailer chassis having front and rear ends, a king pin at its front end for connection to a fifth wheel assembly of an associated tractor unit, and at least one pair of running wheels at its rear end;

the semi-trailer when in the combination being employed with an associated tractor with a tractor chassis having front and rear ends, a steering wheel assembly and driver's cab at the front end and a drive wheel assembly at the rear end, and also when in such combination being mounted on the tractor chassis with its front end close to the rear of the driver's cab and its running wheels adjacent to the tractor drive wheel assembly;

connecting means on the semi-trailer chassis for cooperation with associated connecting means on the tractor chassis when the semi-trailer is mounted on the tractor, the connecting means permitting pitching between the tractor chassis and the semi-trailer chassis while preventing yaw between them; and a retractable landing gear mounted beneath the semi-trailer chassis and movable thereon between a forward position in which it is closer to the king pin and is adapted to support the front end of the semi-trailer in the absence of the tractor, and a rear position in which it is further from the king pin and adjacent to its running wheels and permits the semi-trailer to be mounted on the tractor chassis with its front end close to the rear of the driver's cab and its running wheels adjacent to the tractor drive wheel assembly.

Also in accordance with the invention there is provided a new automotive tractor/semi-trailer combination comprising a new automotive tractor unit as specified above in combination with a new semi-trailer unit as specified above.

Further in accordance with the invention there is provided a combination as specified in the immediately preceding paragraph in combination with a second semi-trailer coupled to the rear of the first mentioned semi-trailer, either by a king pin on the second semi-trailer engaging with a fifth wheel assembly at the rear of the first semi-trailer or by a king pin on the second semi-trailer engaging with a fifth wheel assembly on a dolly coupled to the rear of the first semi-trailer.

DESCRIPTION OF THE DRAWINGS

Tractor units and semi-trailer units, and combined tractor/semi-trailer units, together with the combination of such tractor/semi-trailer units with a second semi-trailer or trailer, all of which are particular preferred embodiments of the present invention, will now be described, by way of example, with reference to the accompanying diagrammatic drawings, wherein.

DESCRIPTION OF THE PREFERRED EMBODIMENTS

Figure 1:
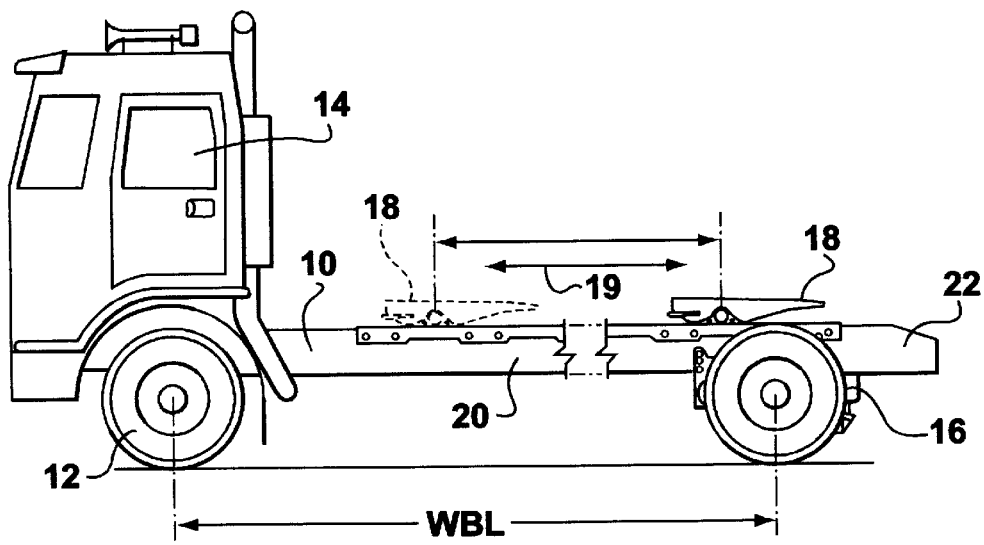
FIG. 1 is a side elevation of a new tractor unit of the invention.

FIG. 1 shows in side elevation a typical automotive tractor unit for use with the present invention comprising a long wheel base tractor chassis 10 having at its front end the usual single axle steering wheel assembly represented by steering wheels 12 and raised driver's cab 14. Tandem steering axle assemblies are sometimes used instead when required to meet wheel loading requirements, and such tandem assemblies can also be used in the tractor units of the present invention. The unit illustrated is provided at its rear end with a single axle drive assembly comprising resiliently mounted drive wheels 16 mounted on respective drive stub axles.

Figure 6:
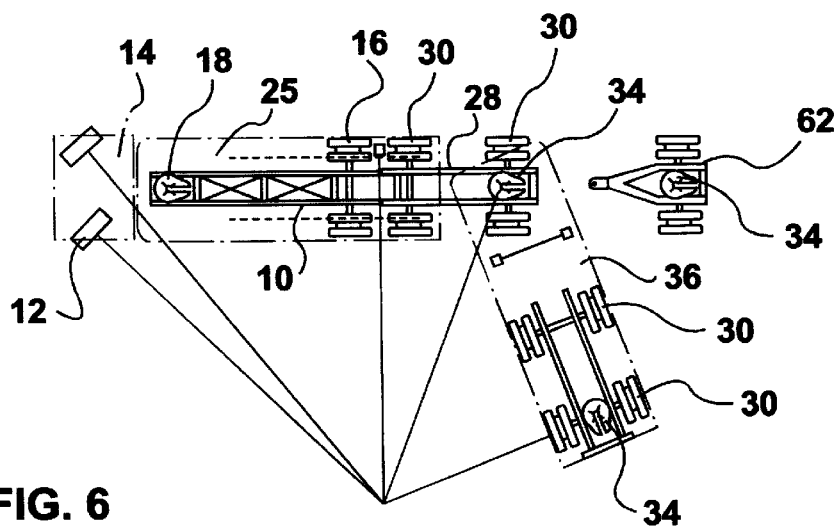
FIG. 6 is a plan view from above showing a tractor unit of the invention and a semi-trailer unit of the invention releasably rigidly coupled together in its forward, centered straight-ahead position, and with a second-semi-trailer coupled to the rear of the first semi-trailer via a fifth wheel assembly mounted on the front semi-trailer running wheel bogie, the Figure also illustrating a so-called "A" type bogie that can alternatively be used to couple the first and second semi-trailers together.

Although in this embodiment only a single axle drive assembly is illustrated a tractor unit of the invention may instead comprise two or more tandem drive axles and their associated driving wheels, a tandem unit with two drive axles being illustrated in FIG. 6. There are many varieties of configurations and wheel suspensions used in the industry for both steering and running wheels, for example as specified by the designer and purchaser, and the specific choice thereof is of no concern in the implementation of the present invention, the specific requirements for any particular unit being apparent to those skilled in the art, so that specific description thereof is not required. The tractor unit is provided with a fifth wheel assembly 18 which, for the purposes of the invention, is mounted on the tractor chassis 10 for an unusually extensive amount of longitudinal movement between a semi-trailer receiving position shown in solid lines close to the rear end of the tractor chassis, and a semi-trailer engaging position shown in broken lines close to the rear of the driver's cab.

For the purposes of the present invention it is essential that the tractor unit be of the so-called long wheel base type, the wheel base length (WBL—see FIG. 1) for this specific embodiment being the distance between the transverse axis of the front steering wheels 12 and the transverse axis of the front drive wheels 16. The representation of the wheel base length for tractors employing tandem steering assemblies and/or tandem drive assemblies is well known to those skilled in the art of automotive design. Tractors of the invention meeting current commercial North American practice are required to have a wheel base of length of from 6.8 meters (22 feet) to 8.5 meters (28 feet). By way of example only, the shortest single semi-trailer currently in common commercial use in North America is 14.4 meters (48 feet) in length and requires the use of a tractor unit with a wheel base length of 6.0 meters (20 feet), while the longest currently commercially used single semi-trailer has a length of 16.2 meters (53 feet) and preferably the tractor unit that is employed with it has a wheel base length of 4.9 meters (16 feet), although a shorter wheel base tractor unit can be employed successfully if the longer wheel base unit is not available.

It is common with currently available tractor/semi-trailer units for the fifth wheel assembly on the tractor to be movable longitudinally on the tractor chassis backwards and forwards by a small amount, usually not more than about 1 meter (3 feet), to permit adjustment of the distribution of the loading between the steering and running wheels. In the tractor units of this invention the extent of the longitudinal back and forth movement, as indicted by the arrows 19 in FIG. 1, must be very much greater, as described above, between a forward position close to the rear of the driver's cab 14 and a rearward position close to the rear end of the tractor chassis. For example, a tractor unit of the shortest preferred wheel base length of 8.1 meters (26 feet) will require a longitudinal movement of the fifth wheel assembly of about 4.7 meters (15 feet), while a tractor unit of the longest preferred wheel base length of 8.5 meters (28 feet) will requires a longitudinal movement of the fifth wheel assembly of about 5.9 meters (19 feet).

Movement of the fifth wheel assembly between its required positions can easily be produced while the assembly is engaged with a semi-trailer king pin by movement of the tractor relative to the semi-trailer while the semi-trailer brakes are applied, so that the assembly is only required to be able to slide on suitable side guides 20 and to be latched in the required end positions, without the need for associated moving means. Nevertheless, some operators may prefer that moving means be provided, for example in the event that for some reason the assembly has not been moved to its required position and cannot be latched against movement, and especially in view of the potential difficulty of moving the heavy assembly by hand. Such moving means may comprise, for example, a multiple extension double acting pneumatic or hydraulic cylinder (not shown) between the assembly and the chassis and extendable and retractable using a pump driven by the tractor motor. Intermediate latch positions may also be provided, particularly some close to the driver's cab, so as to permit adjustment of the load distribution between the steering and running wheels, as with existing units.

Figure 4:
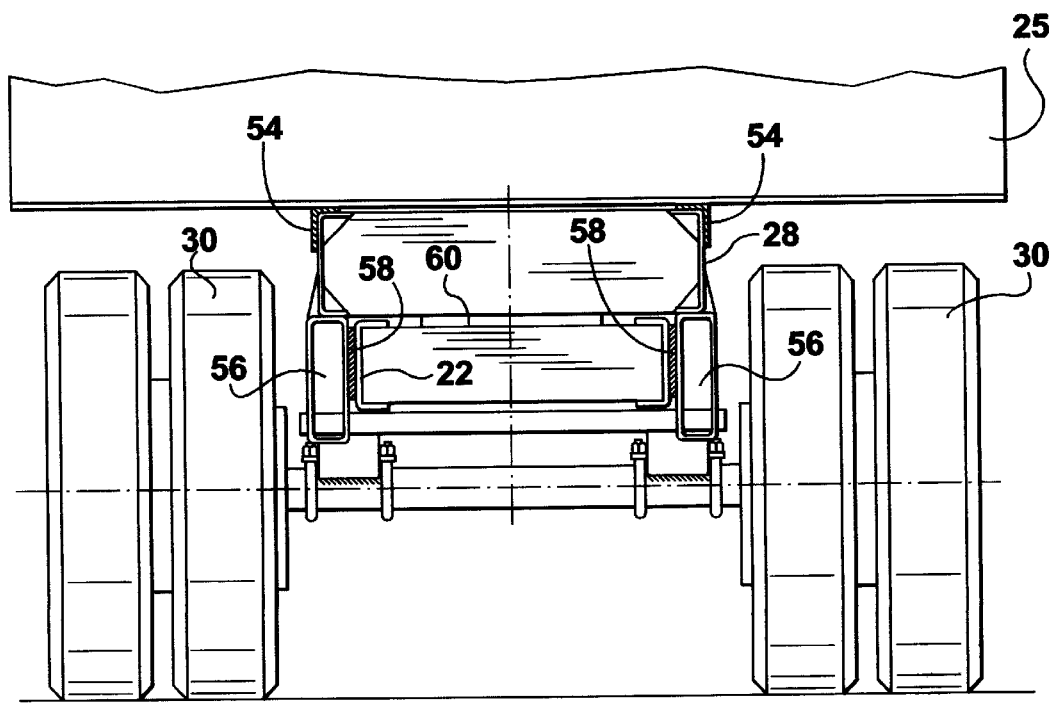
FIG. 4 is a cross section through the semi-trailer of FIG. 2 taken on the line 4—4 therein.

The longitudinal frame members of the tractor chassis terminate at their rear end 22 in a reduced height connecting portion whose function in preventing yaw between the closely couple tractor and semi-trailer will be described below. In this embodiment the frame members also constitute guide means on the tractor chassis for cooperation with associated guide means on an associated semi-trailer chassis, to be described below and best illustrated in FIG. 4, guiding the semi-trailer chassis into straight-ahead mounting position on the tractor chassis, as will also be described below. As will further be described below the guide means permit pitching between the tractor and the semi-trailer chassis while assisting the connecting means in preventing yaw between them, so that when the semi-trailer is so mounted the tractor and semi-trailer are rigidly releasably connected together.

Figure 2:
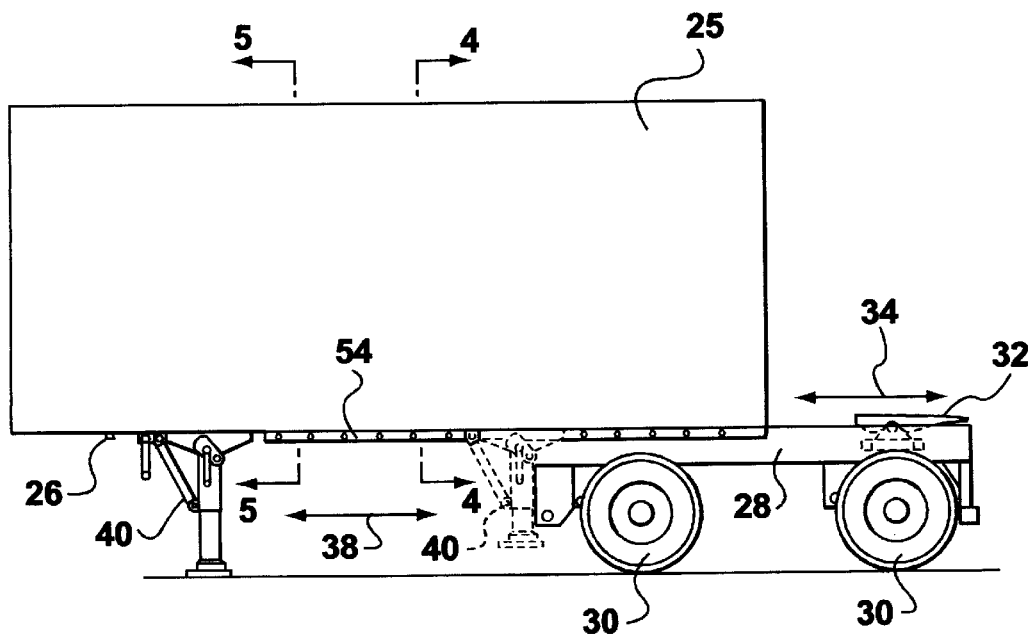
FIG. 2 is a side elevation of a new semi-trailer unit of the invention in which the running wheels are mounted on a bogie which is shown in its rearmost position so as to expose a fifth wheel assembly adapted to receive the king pin of a second semi-trailer, a landing gear therefor being shown in its extreme forward position in solid lines and its extreme rearward position in broken lines.
Figure 3:
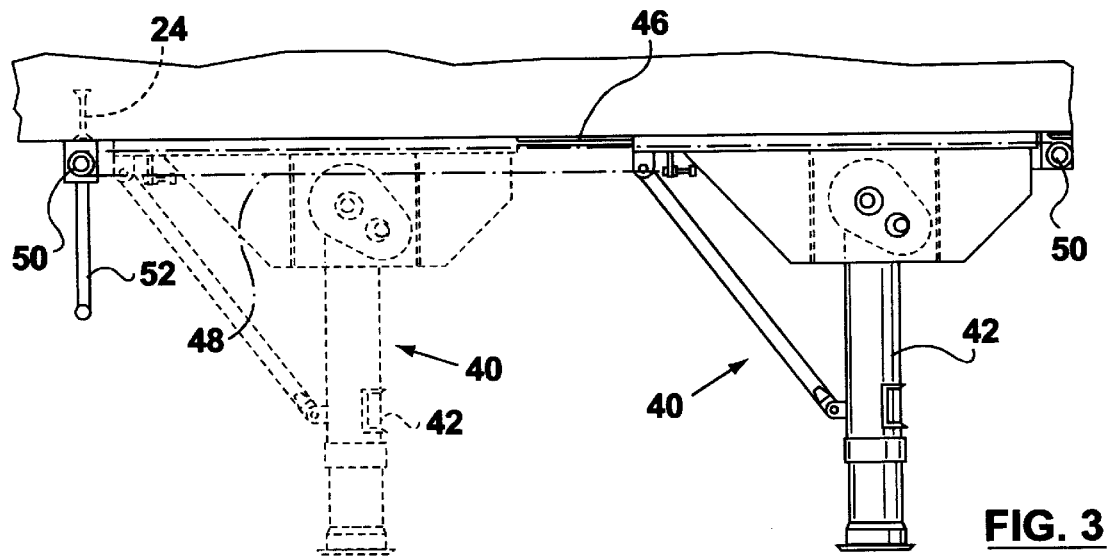
FIG. 3 is a side elevation to a larger scale of the landing gear for the semi-trailer of FIG. 2 in order to show its mounting and means for moving it back and forth between forward and rearward positions.

Referring now to FIGS. 2–5, a semi-trailer of the invention comprises a semi-trailer chassis 24 providing the above-mentioned guide means and supporting a load-receiving box container 25 provided with the usual rear end access doors (not shown). The chassis is provided at its front end with the usual king-pin 26 mounted on a support plate for cooperative engagement with the tractor fifth wheel assembly 18. A tandem bogie 28 at the rear end of the chassis 24 mounts running wheels 30 and a second fifth wheel assembly 32. The bogie is mounted by the semi-trailer chassis for longitudinal back and forth movement as indicated by the arrows 34, and it is shown in FIG. 2 in its rearmost position in which the fifth wheel assembly is exposed and available to receive a second semi-trailer 36, as illustrated in FIG. 6. If a second semi-trailer is not to be used the bogie is moved to a forward position, not shown in FIG. 2 but illustrated with the second semi-trailer 36 in FIG. 6, in which the bogie is fully beneath the container 24 so as not to obstruct unloading thereof through its rear doors.

Figure 5:
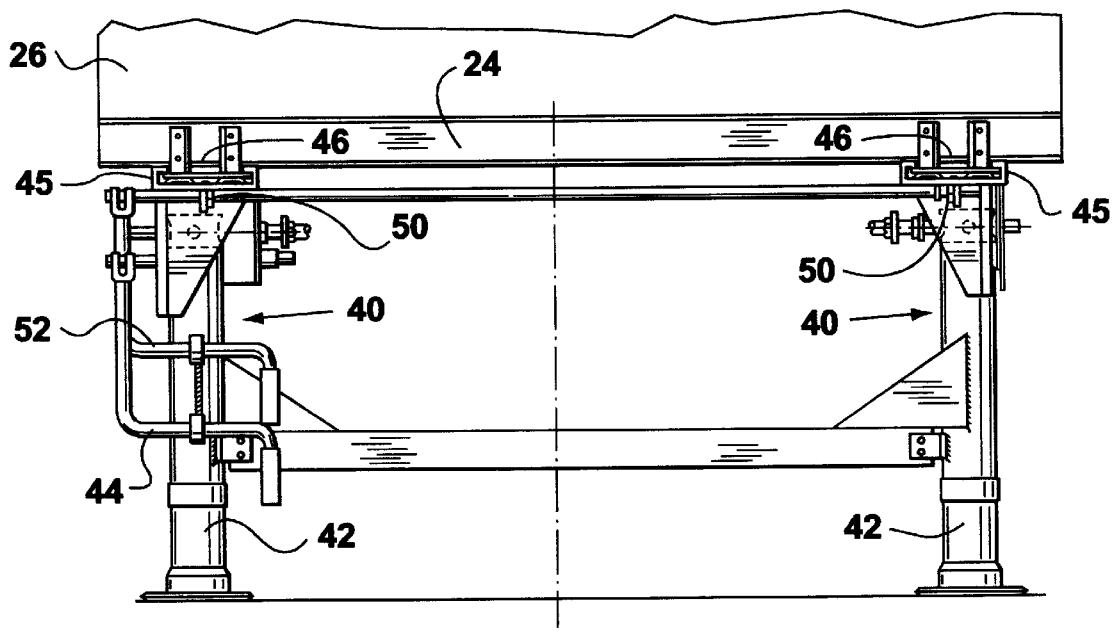
FIG. 5 is a cross section through the semi-trailer of FIG. 2 taken on the line 5—5 therein.

As is best seen in FIG. 5, the semi-trailer chassis also supports thereon for longitudinal back and forth movement, as indicated by the arrows 38 (FIG. 2), a liftable slidable landing gear 40 which when in its forward position shown in solid lines in FIG. 2, supports in the usual manner the front end of the semi-trailer when the tractor is not attached. The landing gear assembly comprises two transversely spaced vertically telescopic legs 42 which are extended and contracted as required by operation of a crank handle 44, shown in FIG. 5 in its stored position beneath the chassis. The entire landing gear assembly is mounted by channel section support members 45 for the required sliding movement along two spaced slide rails 46 attached to the chassis 24. In this embodiment the landing gear is moved by operation of an endless chain drive assembly comprising chain loops 48 connected to the gear and supported by chain sprockets 50 which are mounted to the chassis, and a storable crank handle 52 by which the sprockets are rotated.

It is known to make the landing gear of a semi-trailer slide back and forth a relatively small amount to accommodate different lengths of the tractor after frame and/or fifth wheel location, but the extent of such movement is not sufficient for the purposes of the present invention, wherein extreme movements of about the same extent as the fifth wheel are required, namely from about 4.7 meters (15 feet) to 5.9 meters (19 feet).

The sequence of operations to assemble a rigidly coupled tractor/semi-trailer combination of the invention begins with backing of the tractor with its fifth wheel assembly 18 in its rearmost position until the assembly engages and latches onto the semi-trailer king pin 26. The landing gear legs 42 are now raised using the crank handle 44 and, once fully retracted, the entire assembly is moved backwards by operation of the crank handle 52 until it reaches the rearmost position as shown in broken lines in FIG. 2, in which it is adjacent to the running wheels, being close up against the front end of the bogie 28. The brakes of the bogie running wheels will usually be in the "on" condition when not connected to the tractor controls therefor, and with the brakes so engaged the tractor is backed further underneath the semi-trailer chassis, the tractor fifth wheel 18 sliding forward in its guides to accommodate this rearward movement. Slider guides 54 (FIG. 4) on the semi-trailer chassis engage the tractor chassis and constitute guide means ensuring, as described above, that the semi-trailer body mounts on the tractor chassis properly transversely centred and in an aligned straight ahead attitude. Toward the end of this rearward movement the reduced height connecting end 22 of the tractor chassis passes between the landing gear legs and enters between frame members 56 of the bogie 28 constituting the other cooperating part of the connecting means; these frame members embrace or glove the connecting end 22 to rigidly releasably couple the tractor and semi-trailer together so as to prevent any yaw between them, while permitting a small amount of pitch. This positive prevention of yaw close to the ends of the tractor and semi-trailer is in addition to the yaw prevention provided by the guide means, as described above and is more effective owing to the greater moment arm involved. Friction pads 58 are provided between the chassis end 22 and frame members 56 to reduce wear, and cross reinforcing members are provided as required. If desired a weight transfer plate, or equivalent pneumatic load bearing member, can be interposed at 60 (FIG. 4) to improve the loading of the semi-trailer on the tractor at this point. As described above, the second fifth wheel assembly 34 is now ready to receive a second semi-trailer attached in the conventional manner with an articulation pivot between the two semi-trailers. This second semi-trailer can also be in accordance with the invention, or can be any conventional readily available semi-trailer.

In the event that the semi-trailer running wheels are provided by a single axle, or it is preferred that the semi-trailer end bogie is fixed against longitudinal movement, then any such second semi-trailer can instead be attached to the rear of the first semi-trailer by use of an A-train dolly 62, as shown in FIG. 6, carrying the second fifth wheel assembly 34. Such an arrangement is not as satisfactory since the dolly pivot adds a second articulation pivot point into the combination. However, the two pivots provided by the dolly are relatively very closely spaced together and accordingly introduce must less instability and potential for excessive yaw than the above described prior art double trailer assemblies used hitherto in which the articulation pivot points are separated by the length of the first semi-trailer.

There have been a substantial number of prior proposals for rigidly coupling together two automotive vehicle components, particularly a tractor/semi-trailer combination, but despite the number of such proposals that have been made relatively few such rigs are in use at this time. A fundamental problem has been the apparent need hitherto to accept either a certain amount of instability in the semi-trailer or double trailer combinations, or else a considerable amount of inflexibility in a body fixedly mounted on the tractor unit. The solution provided by the present invention is to provide that the semi-trailer is rigidly coupled yet releasable on the frame of the tractor unit, so as to form in effect an extension thereof, so that a high degree of stability is obtained. The connection of the semi-trailer to the forward tractor is such as to permit a small amount of pitching between them so that adequate weight distribution between them can be maintained, but the presence of the closely coupled and overlapping after frames between the tractor and semi-trailer prevents any of the undesirable yaw rate that in prior proposals has been known to result in overturning and/or jackknifing.

Although in this embodiment a hand-operated chain drive is employed to move the landing gear backward and forward, in other embodiments this can be replaced or supplemented by a drive in which the power is provided by the tractor unit. As a practical matter operator may prefer that a manual drive always be provided in case a suitable tractor is not available. Such a powered drive can, for example, comprise a Twelve volt bi-rotational electric motor (not shown) acting on the chain drive between the landing gear assembly and the chassis and extendable and retractable under the control of appropriate electric switches. Another tractor-powered arrangement that can be employed, but which is not shown, comprises a latch mechanism between the end of the tractor chassis and the landing gear assembly. When the tractor is first backed against the semi-trailer and the king pin 26 engaged with the fifth wheel assembly 18 the latch mechanism is engaged and, as the tractor backs and pushes the fifth wheel assembly forward, at the same time the landing gear assembly is also pushed backward. When the landing gear is snug against the front end of the semi-trailer bogie 28 the latch mechanism is released and the rear connecting end 22 of the tractor chassis continues its rearward movement until it is fully engaged between the cooperating connecting members 58. Similarly, when the tractor is driven forward to release it from the semi-trailer the latch mechanism engages the landing gear and moves it forward as the fifth wheel assembly 18 is moved rearward until it reaches its fully forward position.

I claim:

1. An automotive tractor unit for use in a rigidly-coupled tractor/semi-trailer combination comprising:

a long wheel base tractor with a tractor chassis having front and rear ends, a steering wheel assembly and driver's cab at the front end and a drive wheel assembly at the rear end;

the tractor when in the combination being employed with an associated semi-trailer that has front and rear ends and has a king pin at its front end and at least one pair of running wheels at its rear end;

means mounting a fifth wheel assembly on the tractor chassis for extended longitudinal movement between a semi-trailer receiving position close to the rear end of the tractor chassis and a semi-trailer mounting position close to the rear of the driver's cab;

said extended longitudinal movement being such that in the semi-trailer receiving position the fifth wheel assembly can be coupled with and released from the semi-trailer king pin, and in the semi-trailer mounting position the semi-trailer is mounted on the tractor chassis with the fifth wheel assembly and the king pin coupled together and with the running wheels of the semi-trailer adjacent to the tractor drive wheel assembly; and the tractor chassis having thereon connecting means for cooperation with connecting means on the associated semi-trailer chassis when the semi-trailer is mounted on the tractor chassis, the connecting means permitting pitching between the tractor chassis and the semi-trailer chassis while preventing yaw between them.

2. An automotive tractor unit as claimed in claim 1, wherein the long wheel base tractor chassis has a wheel base of length of from 6.8 meters (22 feet) to 8.5 meters (28 feet).

3. An automotive tractor unit as claimed in claim 1, wherein the fifth wheel assembly is mounted on the tractor chassis for a longitudinal movement of from 4.8 meters (16 feet) to 6.2 meters (20 feet).

4. An automotive tractor unit as claimed in claim 1, wherein the fifth wheel assembly is movable on the tractor chassis for its longitudinal movement by relative movement between the tractor and semi-trailer units.

5. An automotive tractor unit as claimed in claim 1, wherein the fifth wheel assembly is movable on the tractor chassis for its longitudinal movement by motor means connected between the tractor chassis and the fifth wheel assembly.

6. An automotive tractor unit as claimed in claim 1, wherein the tractor chassis comprises guide means operative with cooperating guide means on a connected semi-trailer ensuring that the semi-trailer mounts on the tractor chassis properly transversely centred and in an aligned straight ahead attitude.

7. A semi-trailer unit for use in a rigidly-coupled tractor/semi-trailer combination comprising;

a semi-trailer chassis having front and rear ends, a king pin at its front end for connection to a fifth wheel assembly of an associated tractor unit, and at least one pair of running wheels at its rear end;

the semi-trailer when in the combination being employed with an associated tractor with a tractor chassis having front and rear ends, a steering wheel assembly and driver's cab at the front end and a drive wheel assembly at the rear end, and also when in such combination being mounted on the tractor chassis with its front end close to the rear of the driver's cab and its running wheels adjacent to the tractor drive wheel assembly;

connecting means on the semi-trailer chassis for cooperation with associated connecting means on the tractor chassis when the semi-trailer is mounted on the tractor, the connecting means permitting pitching between the tractor chassis and the semi-trailer chassis while preventing yaw between them; and a retractable landing gear mounted beneath the semi-trailer chassis and movable thereon between a forward position in which it is closer to the king pin and is adapted to support the front end of the semi-trailer in the absence of the tractor, and a rear position in which it is further from the king pin and adjacent to its running wheels and permits the semi-trailer to be mounted on the tractor chassis with its front end close to the rear of the driver's cab and its running wheels adjacent to the tractor drive wheel assembly.

8. A semi-trailer unit as claimed in claim 7, wherein means for moving the retractable landing gear between its forward and rearward positions comprises a hand-operated chain drive including chain loops connected to the landing gear and mounted to the chassis by chain sprockets also mounted to the chassis, and a crank handle by which the sprockets are rotated.

9. A semi-trailer unit as claimed in claim 7, wherein the semi-trailer chassis comprises guide means operative with cooperating guide means on a connected tractor ensuring that the semi-trailer mounts on the tractor chassis properly transversely centred and in an aligned straight ahead attitude.

10. A semi-trailer unit as claimed in claim 7, wherein the landing gear of the semi-trailer can slide back and forth from about 4.7 meters (15 feet) to 5.9 meters (19 feet).

11. A rigidly-coupled tractor/semi-trailer combination comprising an automotive long wheel base tractor unit and a semi-trailer unit;

the tractor unit including a long wheel base tractor chassis having front and rear ends, a steering wheel assembly and driver's cab at the front end and a drive wheel assembly at the rear end, and the semi-trailer unit including a semi-trailer chassis having front and rear ends, a king pin at its front end and at least one pair of running wheels at its rear end;

means mounting a fifth wheel assembly on the tractor chassis for extended longitudinal movement between a semi-trailer receiving position close to the rear end of the tractor chassis and a semi-trailer mounting position close to the rear of the driver's cab;

said extended longitudinal movement being such that in the semi-trailer receiving position the fifth wheel assembly can be coupled with and released from the semi-trailer king pin, and in the semi-trailer mounting position the semi-trailer is mounted on the tractor chassis with the fifth wheel assembly and the king pin coupled together and with the running wheels of the semi-trailer adjacent to the tractor drive wheel assembly; and connecting means on the tractor chassis and associated connecting means on the semi-trailer chassis, the connecting means cooperating with one another to permit pitching between the tractor chassis and the semi-trailer chassis while preventing yaw between them;

and the semi-trailer unit including a retractable landing gear mounted beneath the semi-trailer chassis and movable thereon between a forward position in which it is closer to the king pin and is adapted to support the front end of the semi-trailer in the absence of the tractor, and a rear position in which it is further from the kind pin and adjacent to the running wheels and permits the semi-trailer to be mounted on the tractor chassis with its front end close to the rear of the driver's cab and its running wheels adjacent to the tractor drive wheel assembly.

12. A combination as claimed in claim 11, wherein the long wheel base tractor chassis has a wheel base of length of from 6.8 meters (22 feet) to 8.5 meters (28 feet).

13. A combination as claimed in claim 11, wherein the fifth wheel assembly is mounted on the tractor chassis for a longitudinal movement of from 4.8 meters (16 feet) to 6.2 meters (20 feet).

14. A combination as claimed in claim 11, wherein the fifth wheel assembly is movable on the tractor chassis for its longitudinal movement by relative movement between the tractor and semi-trailer units.

15. A combination as claimed in claim 11, wherein the fifth wheel assembly is movable on the tractor chassis for its longitudinal movement by motor means connected between the tractor chassis and the fifth wheel assembly.

16. A combination as claimed in claim 11, wherein the tractor chassis and the semi-trailer chassis comprise respective guide means operative with one another ensuring that the semi-trailer mounts on the tractor chassis properly transversely centred and in an aligned straight ahead attitude.

17. A combination as claimed in claim 11, wherein means for moving the retractable landing gear between its forward and rearward positions comprises a hand-operated chain drive including chain loops connected to the landing gear and mounted to the chassis by chain sprockets also mounted to the chassis, and a crank handle by which the sprockets are rotated.

18. A combination as claimed in claim 11, and for reception of a second semi-trailer, the combination including a second fifth wheel assembly carried by a dolly at the rear end of the semi-trailer on which the semi-trailer running wheels are mounted.

19. A combination as claimed in claim 11, and including a second fifth wheel assembly for reception of a second semi-trailer, the second fifth wheel assembly being carried by a dolly attached to the rear of the semi-trailer.

20. A combination as claimed in claim 11, wherein the landing gear of the semi-trailer can slide back and forth from about 4.7 meters (15 feet) to 5.9 meters (19 feet).

* * * * *